United States Patent [19]

Jones

[11] 4,119,217
[45] Oct. 10, 1978

[54] METHOD AND APPARATUS FOR HACKING BRICKS

[76] Inventor: Robert E. Jones, 15 S. Oak Forest Dr., Asheville, N.C. 28803

[21] Appl. No.: 768,723

[22] Filed: Feb. 15, 1977

[51] Int. Cl.$^2$ .......................................... B65G 57/26
[52] U.S. Cl. .................................. 214/6 A; 198/458;
214/152; 294/63 A
[58] Field of Search ............... 214/6 A, 152; 198/458;
294/63 A, 63 R, 62, 87 R

[56] References Cited

U.S. PATENT DOCUMENTS

| | | | |
|---|---|---|---|
| 1,418,003 | 5/1922 | Ladd | 214/6 A |
| 2,710,696 | 6/1955 | Fontaine et al. | 214/6 A |
| 3,589,495 | 6/1971 | Pearne et al. | 214/6 A |
| 3,760,966 | 9/1973 | Jones, Jr. et al. | 294/87 R |

FOREIGN PATENT DOCUMENTS 363,595   3/1973   U.S.S.R. ................. 294/63 A

*Primary Examiner*—Albert J. Makay
*Assistant Examiner*—Ross Weaver
*Attorney, Agent, or Firm*—William E. Mouzavires

[57] ABSTRACT

Method and apparatus for hacking green bricks for eventual introduction into a kiln; wherein bricks are placed on a spread table in parallel rows, and the spread table is actuated to space each of the rows of bricks from each other at distances greater than spacings that will be required when the bricks are being fired in a kiln. A brick gripping head having a plurality of elongated brick gripping members is positioned over the spread bricks on the spread table with the brick gripping members extending vertically in the spaces between the rows of bricks and horizontally along the opposite sides of the bricks. The spread table is then actuated to reduce the spacings between the bricks to predetermined final spacings required during firing of the bricks in the kiln. Simultaneously with such retraction of the spread table, the brick gripping members are also moved laterally towards each other to accommodate the decreased spacings between the bricks. In the preferred embodiment, the brick gripping members include air bags which are inflatable for gripping the sides of the brick and deflatable for releasing the brick. When the desired final spacing is achieved by retraction of the spread table, the air bags are inflated to grip the brick for delivery onto a brick stack on a kiln car or pallet which will be taken to the kiln. The next group of bricks to be spaced on the spread table are treated in the same manner, however, prior to stacking on the kiln car, they are rotated as a unit ninety degrees in a horizontal plane by rotating the brick gripping head so that when stacked, the rows of bricks extend at right angles to the rows of bricks previously stacked on the kiln car.

17 Claims, 16 Drawing Figures

METHOD AND APPARATUS FOR HACKING BRICKS

BACKGROUND OF INVENTION

In hacking raw or green bricks for burning in a kiln, it is customary to stack them upon each other, such as on a kiln car, with spaces provided between the rows of bricks in each layer or course to provide as much surface exposure as possible for burning in the kiln. With some commercial brick setting apparatus employed to move and stack the bricks onto the kiln car, a plurality of elongated brick gripping members are inserted between spaced rows of bricks on a spread table to grip the opposite sides of the brick. For example, note U.S. Pats. to Dyhrberg 1,518,641, Penfield 1,760,993, Fontaine et al No. 2,710,696 and Pearne et al 3,478,397. These conventional apparatus require that the rows of bricks be spaced from each other a sufficient distance to permit the gripping members to be inserted between the rows of bricks. In recent times, inflatable brick gripping members have been employed such as, for example, disclosed in the aforementioned Pearne et al patent. These brick gripping members require greater brick spacings than the rigid brick gripping members.

The spacing required between the bricks will, of course, govern the amount of bricks that can be stacked on a given kiln car for a kiln burning operation. The greater the spacing, the lesser is the amount of bricks that can be carried on a given kiln for a burning operation. The efficiency of consumed energy in a given kiln operation will, or course, vary in accordance with the number of bricks burned in the operation.

With todays emphasis on energy conservation, it has now become most important to maximize the number of bricks which can be stacked on a kiln car to be fired in a kiln but this requires decreased or minimum spacing between the rows of bricks in contrast to conventional brick arrangements. In certain commercial operations this has presented a problem due to the spacings required for placement of the brick gripping members between the rows of bricks. In addition, the problem is affected by the requirement that successive course or courses of bricks stacked on the kiln car be placed at right angles to the preceding course or courses in order to form a stable stack of bricks. The present invention is a solution to this problem.

OBJECTS OF INVENTION

The present invention relates to improved methods and apparatus for hacking green or raw bricks so as to maximize the number of bricks that can be fired in a kiln per unit kiln car or other given space requirements while, at the same time, providing spacing between rows of bricks while in the kiln car for exposing brick surfaces for burning. Included herein is the provision of such method and apparatus which also enable each course or courses of bricks stacked on the kiln car to be placed at right angles to the preceding course or courses to provide a stable stack.

Another object of the present invention is to provide method and apparatus for spacing parallel rows of bricks from each other a predetermined minimum amount which will increase the number of bricks that may be fired in a kiln while, at the same time, permitting utilization of conventional or other setter heads which may include air bags for gripping the opposite sides of the bricks for delivery onto a kiln car or the like.

Another object of the present invention is to provide an improved brick gripping head otherwise known as a "setter" for gripping the opposite sides of a plurality of rows of bricks for setting on a pallet or kiln car or the like.

SUMMARY OF INVENTION

In summary, the present invention is carried out by method and apparatus wherein one or more courses of raw or green bricks are placed on a spread table with each course containing a plurality of parallel rows of bricks. The spread table is actuated to first spread the rows of bricks apart predetermined amounts greater than certain minimum spacings to be achieved when the bricks are later placed in a kiln for burning. A brick gripping head, commonly referred to in the trade as a "setter," is then lowered over the bricks on the spread table with elongated brick gripping members extending in the spaces between the rows of bricks and along opposite sides of the bricks. This initial spacing which may be termed "overspread" easily permits the brick gripping members to be inserted between the rows of bricks. In the preferred embodiment, the brick gripping members of the brick gripping head include alternate inflatable air bags and rigid supports between which the bricks are gripped upon inflation of the air bags.

Continuing with the sequence of operation, the spread table is then actuated to a retracted position decreasing the spacings between the rows of bricks during which time the brick gripping members are also moved closer to each other to accommodate these decreased spacings which in total will equal the total of the final spacings at which the bricks will be positioned when in the kiln car for burning. The inflatable brick gripping members are then inflated to cause each of the rows of bricks to be gripped along their opposite sides. With the bricks so gripped while in the final desired spacing pattern, the setter head is then moved to transport the bricks onto a pallet or kiln car or the like at which point the inflatable brick gripping members are deflated to release and stack the bricks with the desired spacing between the rows of bricks. The subsequent course or courses of bricks to be stacked is handled in the same manner onto the spread table to provide the same desired final spacings between the rows of bricks except that when stacked on the preceding course on the kiln car, the succeeding course is rotated ninety degrees in a horizontal plane prior to stacking.

Although in the preferred embodiment described, the brick gripping members of the setter head include alternate inflatable and rigid brick gripping members, it should be understood that other brick gripping members including conventional brick gripping members may be employed in achieving the desired minimum spacing between the bricks for firing in the kiln.

DRAWINGS

Other objects and advantages of the present invention will become apparent in the following detailed description of the drawings in which.

DETAILED DESCRIPTION

Figure 1:
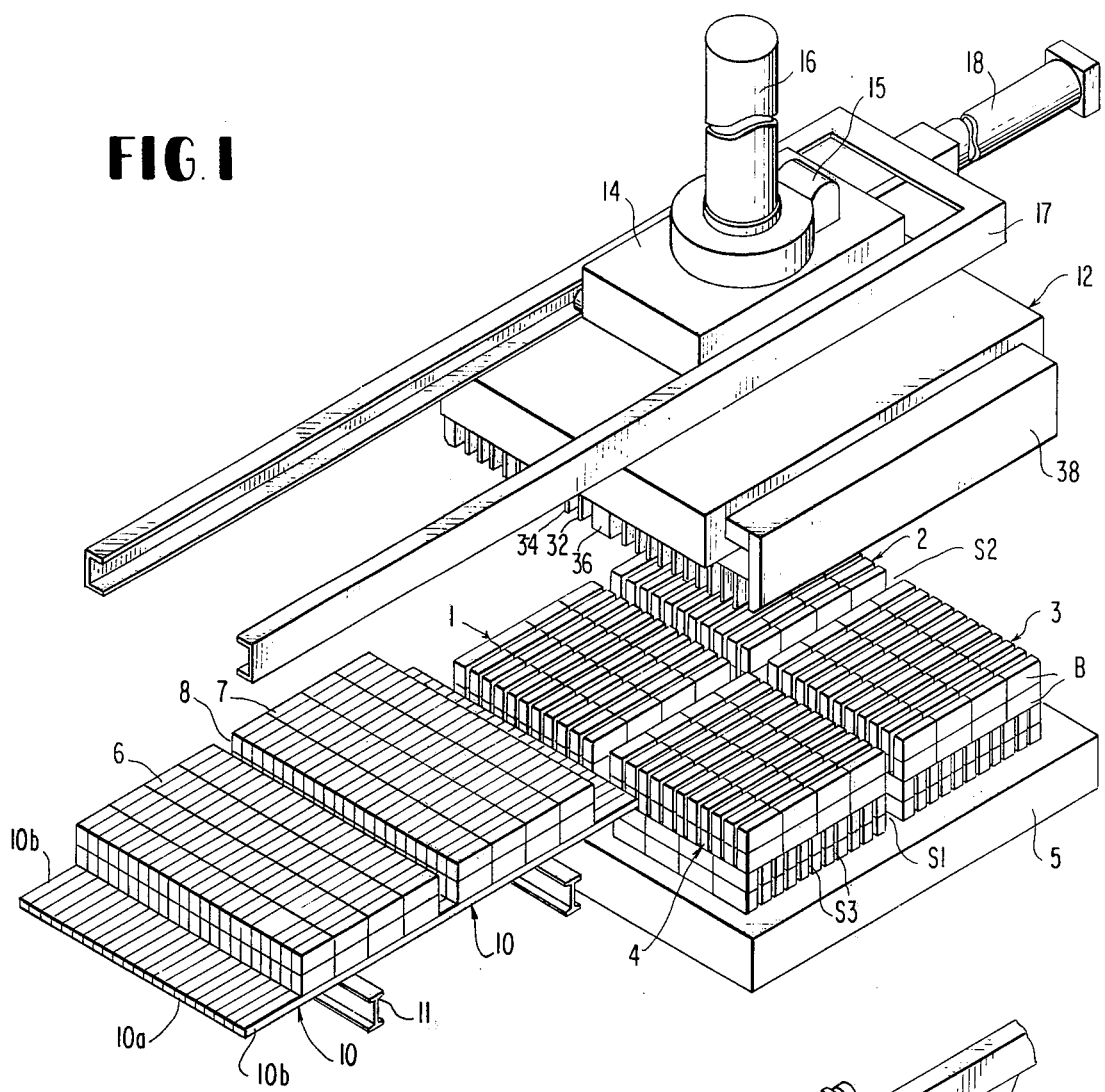
FIG. 1 is a perspective view of bricks being processed by a spread table and brick gripping head in accordance with the present invention for eventual introduction into a kiln (not shown)

Referring now to the drawings in detail and initially to FIG. 1, there is shown for illustrative purposes only, methods and apparatus for stacking groups of bricks such as those designated 1, 2, 3 and 4 on a kiln car generally designated 5, with spaces S1 and S2 between the brick groups 1, 2, 3 and 4 and spaces S3 between each of the rows of bricks in each brick group. This spacing arrangement will provide exposed brick surfaces for achieving effective firing of the bricks when in the kiln (not shown). In addition, this spacing will facilitate automated mechanical handling of the bricks after the kiln operation when they are further processed into brick packs for shipment to points of use or commercial distribution. Although a kiln car platform 5 is shown in FIG. 1 for illustrative purposes, the bricks may be stacked on a pallet (not shown) or other similar member for transportation to the kiln. Furthermore, although the methods and apparatus of the present invention are particularly useful in handling green or raw brick for transportation to a kiln in a brick manufacturing line after the brick slugs have been extruded and cut into bricks, certain aspects of the present invention have applicability to finished bricks as opposed merely to green bricks or brick slugs. In addition, and although in accordance with one preferred form of the present invention, the bricks B in each course of bricks stacked on the kiln car 5 are comprised of eleven rows of bricks with each row including four bricks as shown in FIG. 1, other brick arrangements may be achieved utilizing the present invention.

Prior to placement on kiln car 5, the bricks are processed on a spread table, generally designated 10 in FIG. 1, where they are arranged in separate groups 6 and 7 each containing two courses or layers of bricks with each course containing twenty-two rows of bricks with each row containing four bricks, and with a space 8 formed between successive groups 6 and 7. Brick groups 6 and 7, as well as succeeding brick groups (not shown), are brought to spread table 10 and arranged in this manner by any suitable means which forms no part of the present invention and therefore need not be shown.

As will be described in greater detail, brick groups 6 and 7 are spaced while on the spread table 10 and then removed and deposited on the kiln car 5 by means of a "setter" or brick gripping head generally designated 12. As is conventional, brick gripping head 12 may be mounted in a suitable support generally designated 14 for rotational movement in a horizontal plane relative to support 14 under the actuation of a motor, generally designated 15 (see FIG. 1). In addition, brick gripping head 12 is movable in a vertical plane between upper and lower positions relative to support frame 14 by means of a motor which may be a pressure cylinder or fluid motor, generally designated 16. This vertical movement permits the brick gripping head 12 to be lowered towards the spread table 10 and also towards the stacked brick groups 1, 2, 3 and 4 on the kiln car 5. The rotational movement of brick gripping head 12 permits each successive course being handled to be rotated 90° prior to placement on the stacks 1, 2, 3 and 4 on the kiln car 5. FIG. 1 illustrates the alternate ninety degree orientation of successive courses stacked on the kiln car wherein the uppermost two courses of bricks which are handled together, as will be described, have their eleven rows extending at right angles to the eleven rows in the lowermost two courses of bricks. Brick gripping head 12 is further movable as a shuttle in a horizontal plane between positions overlying spread table 10 and kiln car 5. This may be provided by any conventional means including a track 17 in which the brick gripping head support frame 14 is mounted, and a motor such as a hydraulic cylinder or pneumatic motor 18 for moving support frame 14 along track 17.

Figure 2A:
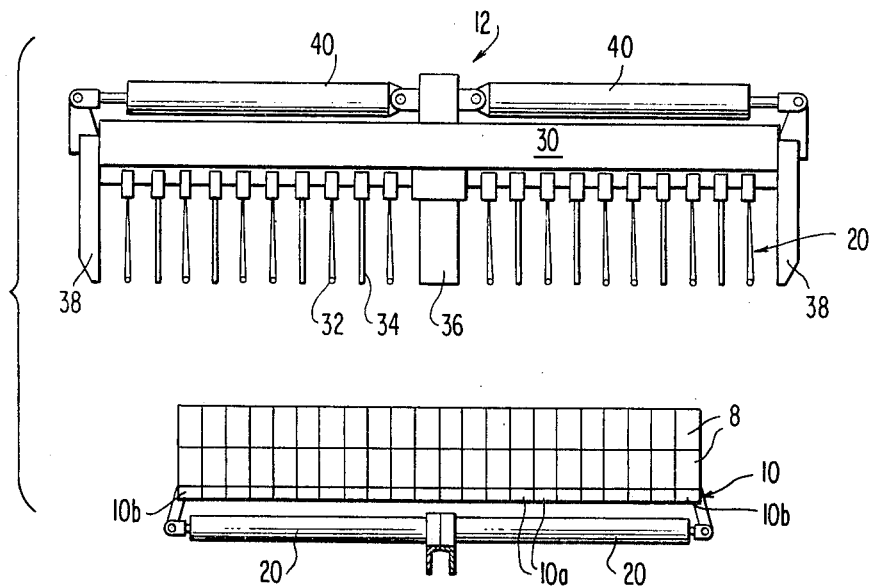
FIG. 2A is an end elevational view of the spread table and the brick gripping head when at an initial phase in their operation.

Referring now to FIGS. 1 and 2A, spread table 10 includes a plurality of elongated spreader bars or slats 10a mounted on a suitable support, generally designated 11 in FIG. 1, in a horizontal plane in side-by-side relationship for movement between a closed position shown in FIGS. 1 and 2A wherein the spreader bars engage or substantially engage each other; and two different spread apart positions wherein the spreader bars are spaced from each other with predetermined spacings, one of which corresponds to the final spacings S3 to be achieved between the rows of bricks when on the kiln car 5 and the other corresponding to "overspread" spacings which are larger than the final spacings S3, as will be further explained. Spreader bars 10a are movable between these positions by any suitable means which may include, such as in the shown embodiment (see FIG. 2A), a pair of pneumatic cylinders 20 respectively connected to the end spreader bars 10b for actuating the latter between spread and closed positions. Intermediately positioned spreader bars 10a are connected to each other and ultimately to end spreader bars 10b such that actuation of the end spreader bars 10b will ultimately be transmitted in consecutive fashion to all of the intermediate spreader bars 10a to spread the same between the aforementioned two spread apart positions. The structure for carrying the latter out will be described below in connection with FIGS. 3 and 7A through 7C.

With continuing reference to FIGS. 1 and 2A, brick gripping head, generally designated 12, includes a support frame 30 from which there are suspended a plurality of elongated brick gripping members 32 and 34 for gripping therebetween the opposite sides of bricks arranged in rows in accordance with the present invention. As illustrated in FIG. 1, these brick gripping members are sufficiently elongated to enable them to grip rows of bricks each containing eight bricks. Although in carrying out certain aspects of the present invention, each of the brick gripping members may have a relatively rigid construction, it is preferred that alternate brick gripping members be comprised of an inflatable bag termed an "air bag," generally designated 32, and a rigid elongated member 34 which may be termed a "board." In this manner, inflation of air bags 32 is utilized to grip the brick between the air bags 32 and the next adjacent rigid brick gripping members or boards 34. The brick gripping members also include end brick gripping members 38 which are connected to actuators, such as fluid motors 40, for extending or retracting brick gripping members 38 and, in turn, spreading or bringing closer together brick gripping members 32 and 34. Structure for carrying this out will be further described below in connection with FIGS. 3, 4 and 5. In the preferred embodiment, the brick gripping members further include a central brick gripping member 36 which may be made from rigid board or from an air bag (not shown) for providing the spaces S1 and S2 (see FIG. 1) in the final brick groups 1, 2, 3 and 4 as will be described.

SEQUENCE OF OPERATION

Referring now to FIGS. 2A through 2F and initially to FIG. 2A, in carrying out the method of the present invention, a plurality of rows of bricks are formed on the spread table 10 in one or more courses, preferably two courses one on top of the other, as shown in FIG. 1. It is also preferred that the bricks be spaced, such as at 8 shown in FIG. 1, to form successive brick groups 6 and 7 while on the spread table as shown in FIG. 1. In this position, all of the rows of bricks in each group 6 and 7 engage or substantially engage each other while the spreader bars are in closed position wherein they engage or substantially engage each other as shown in FIG. 2A.

Figure 2B:
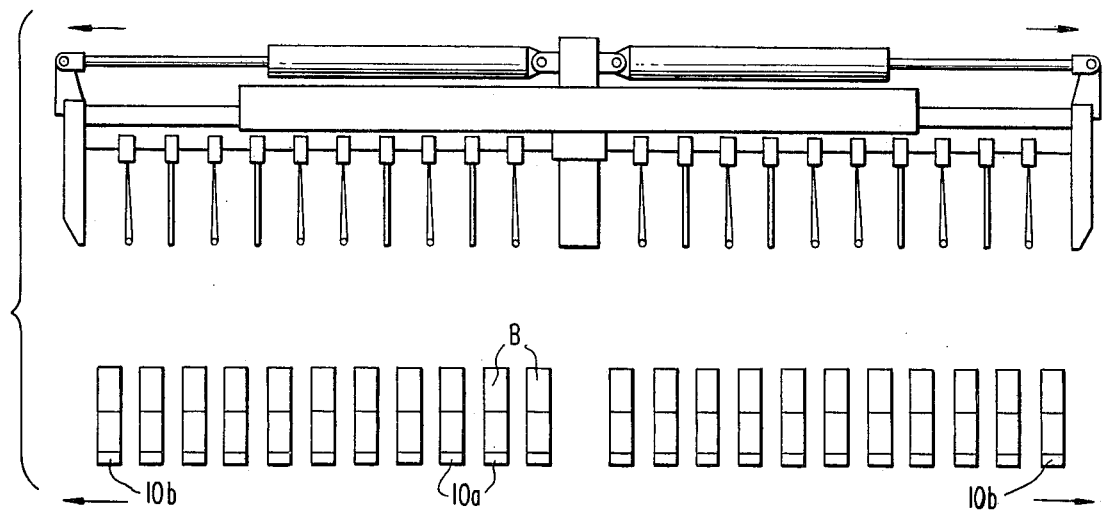
FIG. 2B is a view similar to FIG. 2A but with the spread table and brick gripping head shown in first spread positions.

Spread table 10 is then actuated to spread its spreader bars 10a from each other from the position shown in FIG. 2A to the position shown in FIG. 2B which is to an initial spread position which may be termed "overspread" since the spacings between the bricks are larger than the final spacings S3 that will be required in the kiln for burning. This overspread position is illustrated in FIG. 2B. As further illustrated in FIG. 2B, brick gripping members 32, 34 and 38 are actuated to align them over the spaces between the rows of bricks as they exist in their overspread position shown in FIG. 2B.

Figure 2C:
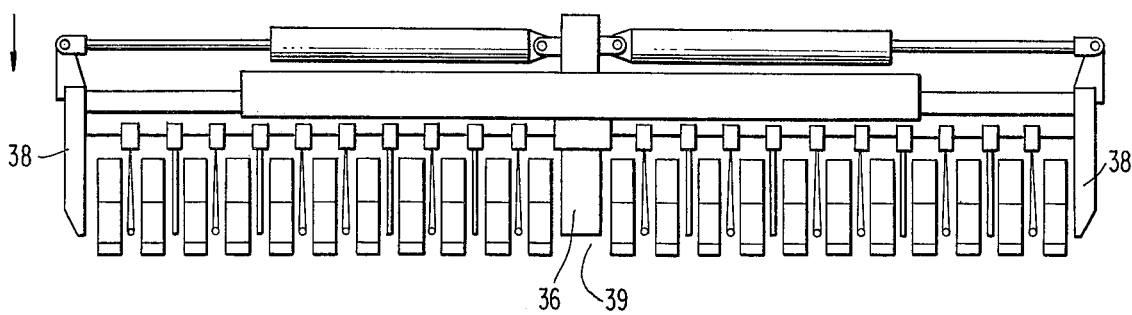
FIG. 2C is a view similar to FIG. 2B except that, in the present figure, the brick gripping head has been lowered to position its brick gripping members between the rows of bricks on the spread table.

Referring to FIG. 2C, brick gripping head 12 is then vertically lowered to insert its brick gripping members into the spaces provided between the rows of bricks with the end brick gripping members 38 straddling and spaced from the outer rows of bricks and with the middle brick gripping finger 36 inserted into an overspread space 39 provided between the two innermost spreader bars as best shown in FIG. 2C.

Figure 2D:
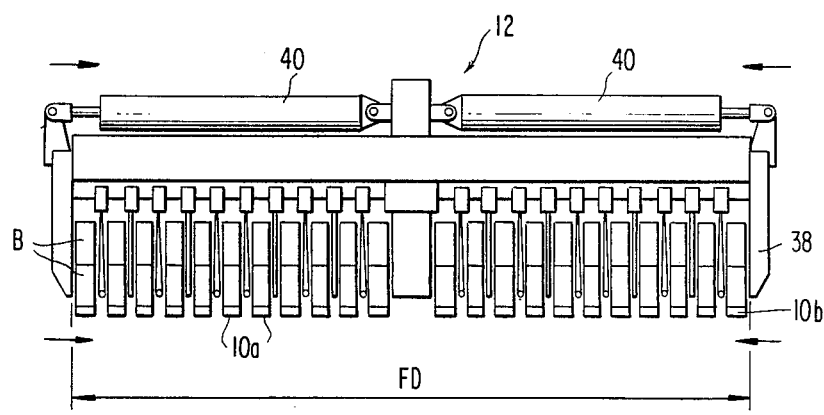
FIG. 2D is a view similar to FIG. 2C except that the spreader bars of the spread table and the brick gripping members of the brick gripping head have been moved to decrease the spacing between the rows of bricks.

Referring to FIG. 2D, the spreader bars 10a, 10b of the spread table are then actuated to move them closer to each other, as indicated by the arrows in FIG. 2D, so as to decrease the spacings between the rows of bricks to equal the total of the final spacings S3 to be required in the kiln so that the final dimension FD across the rows of bricks as indicated in FIG. 2D, will equal the same dimension across these rows when on the kiln car. Simultaneously with the latter operation of the spread table, the brick gripping members 32, 34, 38 are moved closer to each other as indicated by the arrows in FIG. 2D to accommodate the decreased spacing imparted to the bricks by the spread table.

Figure 2E:
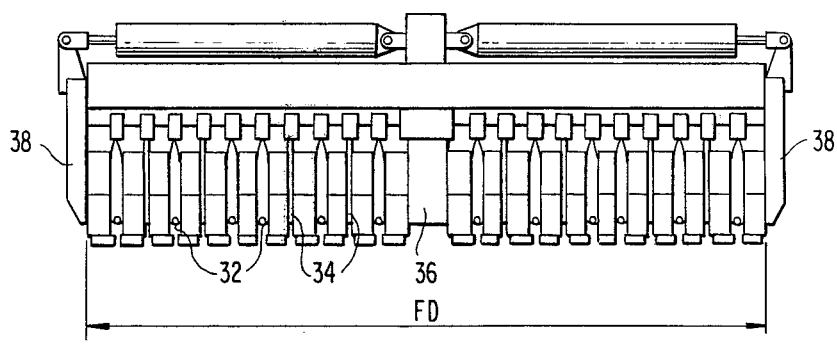
FIG. 2E is a view similar to FIG. 2D except that the brick gripping members have been actuated to grip the bricks on opposite sides thereof.

Referring to FIG. 2E, with the bricks having been placed to achieve the final dimension FD shown in FIG. 2D and with the outer gripping members 38 maintained fixed, the inflatable bags 32 are inflated to cause the bricks to be positively and firmly gripped between inflatable bags 32 and the rigid boards 34, 36, while the outer gripping members 38 are maintained in the same position they were in as a result of the operation illustrated in FIG. 2D. Thus while some of the individual spacings between the bricks vary from the FIG. 2D mode to the FIG. 2E mode by virtue of the inflation of the bags 32, the total of the final spacings remains the same so that the overall dimension FD of the bricks will remain the same. In the preferred embodiment of the invention shown in FIGS. 8 and 9 and to be described below, the bricks do not change their position during inflation of the bags 32 to grip the bricks so that the spacings between the bricks when the bricks are moved towards each other from the overspread positions of FIGS. 2B, 2C to the final spacing position of FIG. 2D, remains the same and equals the spacings when the bricks are in the kiln.

Figure 2F:
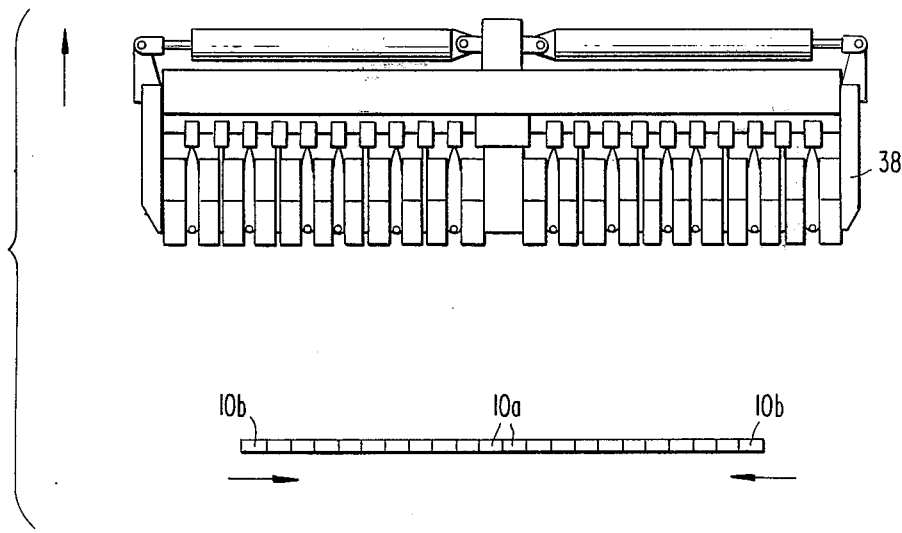
FIG. 2F is a view similar to FIG. 2E except showing the brick gripping head raised for transferring the gripped bricks to a kiln car or the like and also showing the spread table in a closed position.

As illustrated in FIG. 2F, the gripping head 12 may then be raised from spread table 10 and moved back to a position overlying the kiln car 5 where the head 12 may then be moved downwardly to place the gripped courses of brick on the preceding stacked courses in the kiln car. The inflatable bags 32 may then be deflated to release the two courses of bricks on the previous courses with the desired final spacings between the brick rows such that the overall dimension across the rows will equal FD.

It will thus be evident that the spaces S1 and S2 between the groups of bricks 1, 2, 3 and 4 on the kiln car 5 are produced by the spacing 8 on the spread table and also by the middle brick gripping finger 36 which provides a space between the two innermost bricks. The spacings S3 are produced by the spread table 10 and brick gripping head 12 in accordance with the present invention which now permits bag-like brick gripping members to be easily inserted between the rows of bricks on the spread table without upsetting the rows and yet permits a desired final minimum spacing to be achieved to increase the number of bricks that can be stacked on a given kiln car.

Figure 6:
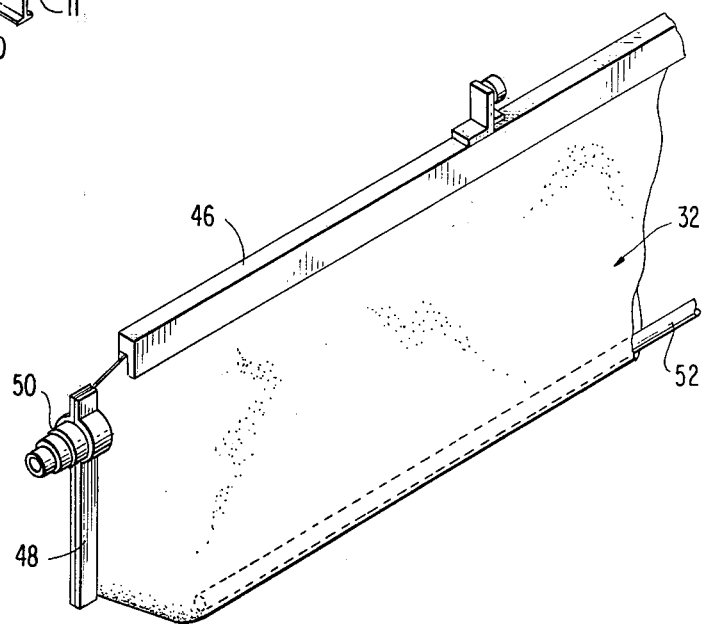
FIG. 6 is an enlarged, fragmental, perspective view of a brick gripping member in the form of an inflatable bag included in the brick gripping head.
Figure 4:
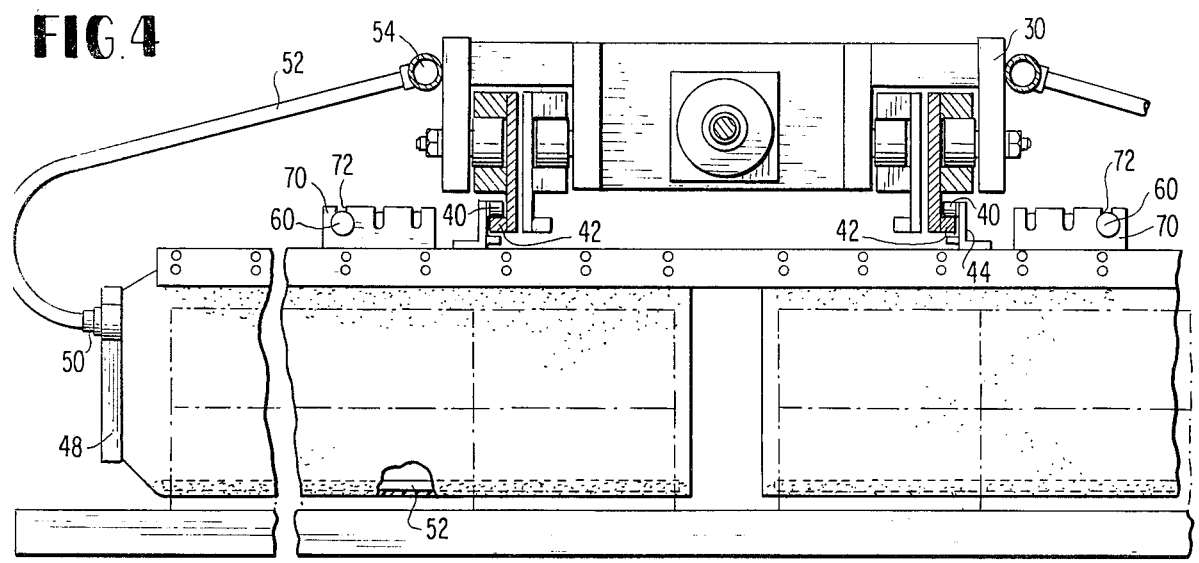
FIG. 4 is a fragmental cross-sectional view taken generally along lines 4—4 of FIG. 3.
Figure 5:
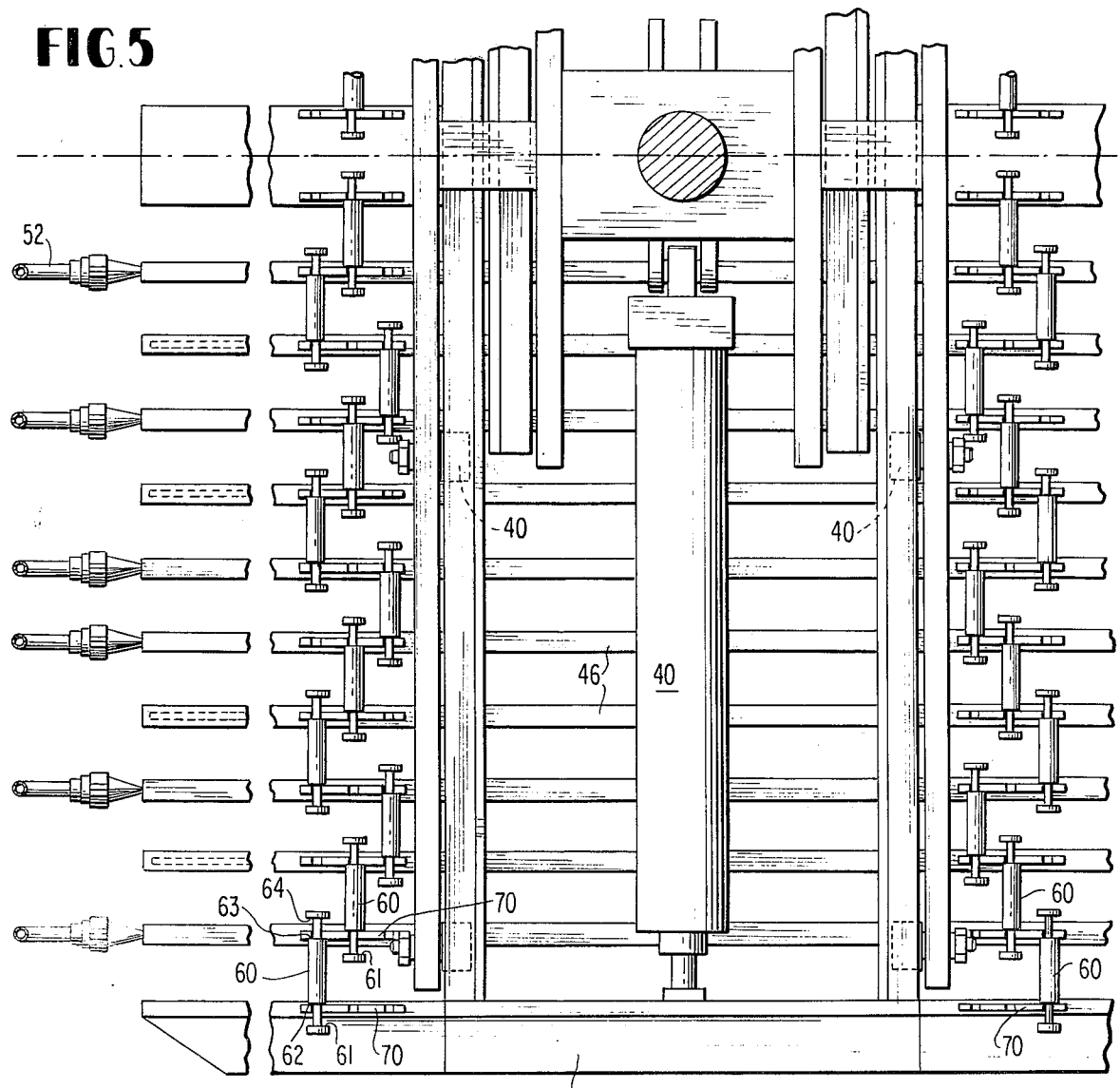
FIG. 5 is a fragmental plan view of the brick gripping head.

Referring to FIGS. 4, 5 and 6, each of the intermediate brick gripping members 32 and 34 are suspended from the frame 30 for lateral movement relative to each other along the frame by means of rollers 40 mounted on tracks 42 formed on support frame 30. Rollers 40 are mounted to the associated brick gripping member by means of a bracket 44 which is fixed to the top of the brick gripping member as best shown in FIGS. 4 and 6, the latter figure showing an inflatable brick gripping member 32. It will be understood that a pair of such rollers 40 are fixed to each brick gripping member and mounted on tracks 42 as best shown in FIGS. 4 and 5. As indicated, brick gripping members in the preferred embodiment include elongated rectangular rigid members such as may be made from plywood boards 34. The other intermediate brick gripping members are the inflatable bags 32 which, in the specific embodiment shown, may be formed by folding flexible material upon itself and fastening the upper free edges in a frame 46 shown in FIG. 6. One of the ends of the inflatable brick gripping members 32 (not shown in FIG. 6) may be sealed by any suitable manner while the opposite end is sealed by an elongated clamp 48 shown in FIG. 6. In addition, a fluid port is provided by a fitting 50 for purposes of introducing air or other suitable gas into the bag 32 to inflate the same and for evacuating air from the bag. Further, it is preferred in accordance with the present invention, that a weight of predetermined magnitude be placed in the bag 32 at the bottom which weight may take the form of elongated lead or steel rods 52 extending throughout the bag, one such rod being best illustrated in FIG. 6. The weight of rods 52 will help to shape the bag 32 to facilitate insertion between the brick rows on the spread table. In addition, the weight of rods 52 is chosen so that when port 50 is open to evacuate air from the bag 32, the weight 52 will in effect draw the opposite side walls of the bag 32 together to help evacuate the air through port 50. Air may be supplied and exhausted through conduits 52 connected to ports 50 and through manifolds 54 mounted on the support frame 30, as best shown in FIGS. 4 and 5.

Transmission of motion between successive brick gripping members 38, 32, 34 is achieved through a plurality of links 60 mounted in brackets 70 fixed to the top of each of the brick gripping members, as shown in FIGS. 4 and 5. Referring to FIG. 5, links 60 include on their opposite ends a pair of stop surfaces 61, 62 and 63, 64 engageable with opposite surfaces on the associated brick gripping member to form a consecutively acting transmission system interconnecting the brick gripping members. In the specific embodiment shown, the link mounting brackets 70 are formed with at least one slot 72 (three slots shown) in the upper edge thereof for insertion of links 60 as best shown in FIG. 4. It will thus be seen that when the outer brick gripping members 38 are, for example, moved outwardly away from the center of the head by their associated motor 40, brick gripping members 38 will eventually contact stop surface 61 on the associated link 60 and continued movement will cause stop surface 64 on the other end of link 60 to engage the next adjacent brick gripping member to move that outwardly until it engages stop surface 61 on the next link 60 which, in turn, will have the same effect on the next adjacent brick gripping member. When it is desired to retract the brick gripping members towards each other, the opposite effect will be achieved in which stop surfaces 62 and 63 of links 60 will come into play to transmit motion to the brick gripping members in consecutive fashion. Any other suitable means may be provided for actuating the brick gripping members towards and away from each other in carrying out the present invention.

Figure 3:
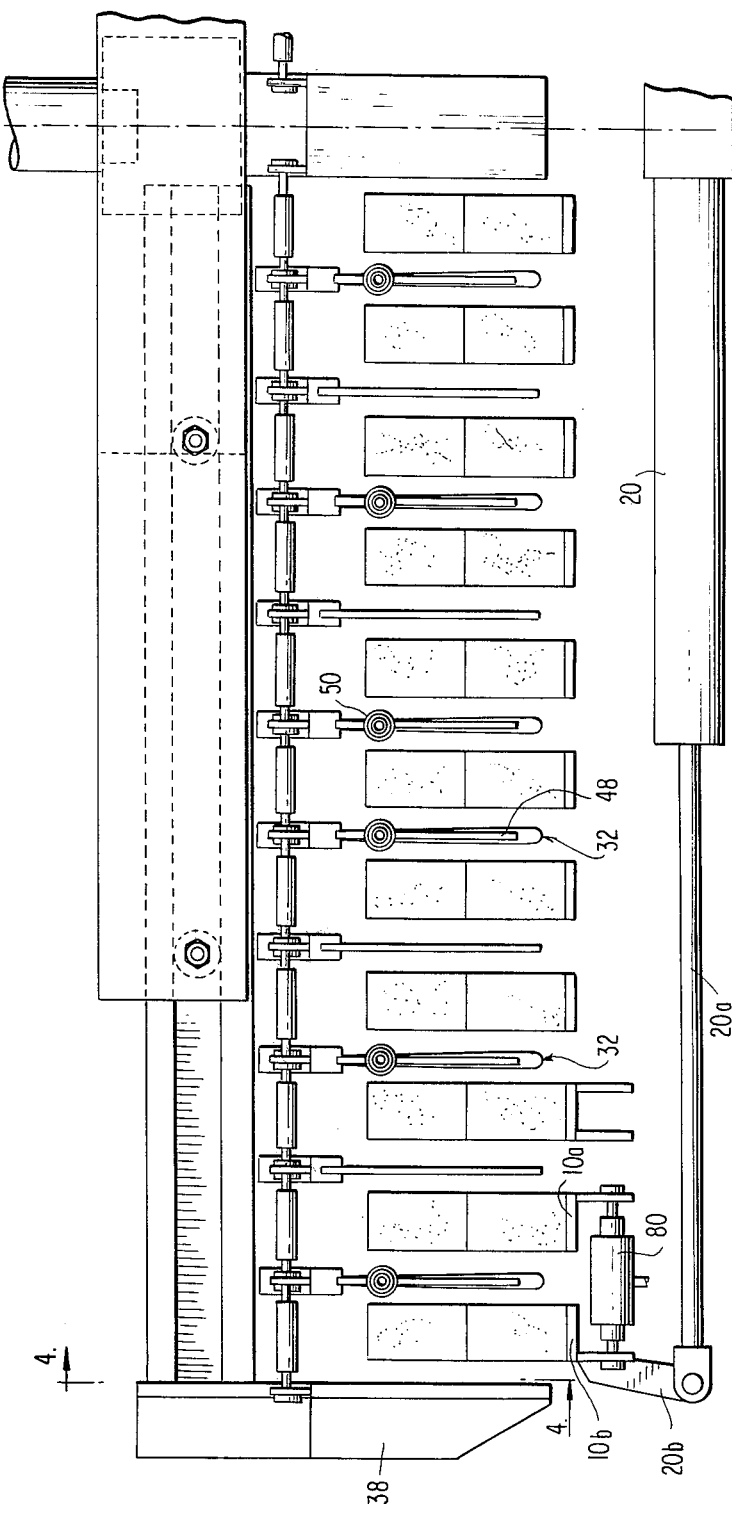
FIG. 3 is an enlarged end elevational view of the brick gripping head on with its brick gripping members inserted in the spaces between the rows of bricks on the spread table.
Figure 7C:
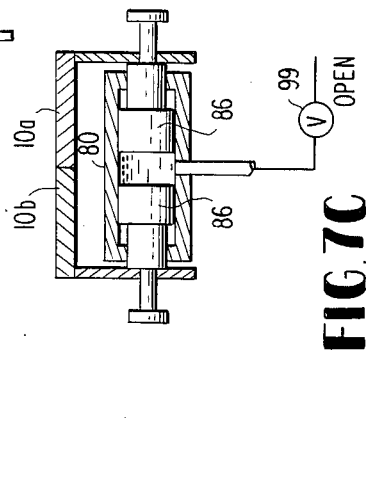
FIGS. 7A, 7B and 7C are schematic views illustrating a control system for moving the spreader bars of the spread table between various predetermined positions thereof.
Figure 7B:
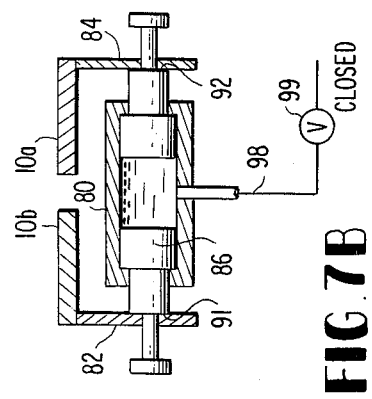
Figure 7A:
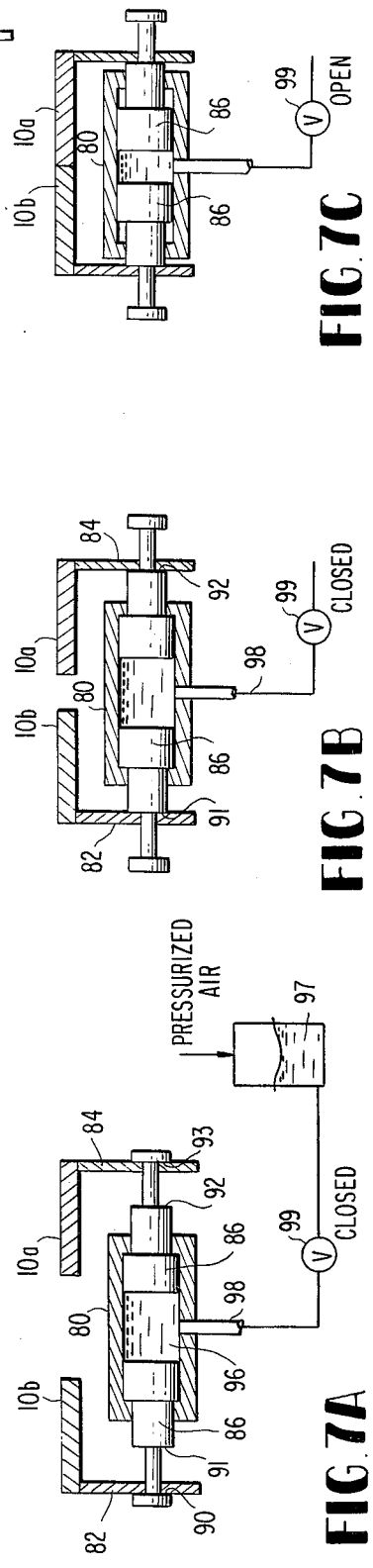

Any suitable system may be provided for actuating the spreader bars 10a and 10b of the spread table 10 between the overspread position shown in FIGS. 2B and 7A; the final spacing position shown in FIGS. 2D, 2E and 7B, and the closed position shown in FIGS. 2A and 7C. Referring to FIGS. 3 and 7A, such a system may include a series of links 80, including stop surfaces, interconnecting spreader bars 10a and 10b to consecutively transmit motion from one spreader bar to the other starting with the outermost spreader bars 10b in the same general fashion as utilized with the brick gripping members as described above.

In the specific embodiment shown, stops 80 include a fluid cylinder having piston-like stop members 86 slidably mounted therein and also being mounted in apertures in brackets 82 and 84 fixed to depend from spreader bars 10a and 10b as shown in FIG. 7A. Stop members 86 provide, at the opposite ends of links 80, opposed pairs of stop surfaces 90, 91 and 92, 93 cooperable with brackets 82 and 84 to transmit motion from one spreader bar to the next in consecutive fashion. As indicated above, power for actuating the spreader bars 10a and 10b is derived from a motor 20 having a rod 20a connected to bracket 82 of the outermost spreader 10b by means of a link 20b. To control the position of stop members 86 in cylinder 80, hydraulic fluid is introduced into the cylinder 80 between the stop members 86 from a reservoir 97 through means of a conduit 98 having a valve 99 controlling flow between reservoir 97 and cylinder 80.

Referring to FIG. 7A, should it be desired, for example, to move the spreader bars 10a and 10b from the overspread position shown in FIG. 7A to the final spacing position shown in FIG. 7B, valve 99 is closed and motor 20 is actuated to retract rod 20a until bracket 82 of spreader bar 10b engages stop surface 91 of stop member 86 as shown in FIG. 7B at which point the final spacing position between the spreader bars 10a snd 10b will be achieved as shown in FIG. 7B. Continued retraction of rod 20a by motor 20 will have no effect on moving stop member 86 in cylinder 80 because valve 99 is in closed position and the fluid 96 in cylinder 80 will not be compressible. However, such continued traction of rod 20a will have the effect of causing the entire stop member 80 to move to the right until stop surface 92 engages bracket 84 of the adjacent spreader bar 10a as shown in FIG. 7B whereupon another stop surface on another link 80 (not shown) mounted in bracket 84 will be engaged by bracket 84 to actuate the next adjacent spreader bar 10a until eventually all of the spreader bars 10a are moved into the final spacing position corresponding to that shown in FIG. 7B.

In order to move the spreader bars 10a and 10b to the closed position shown in FIG. 7C, valve 99 is opened to relieve some of the pressure in cylinder 80 to permit the stop members 86 to move in the cylinder towards the center of the cylinder until the spreader bars 10a and 10b are engaged. It should be understood the system illustrated is by way of example only, and that any other means may be provided for moving the spreader bars between the desired positions to carry out the present invention as long as a positive stop means or the equivalent is provided for defining the two different spread apart positions of the spreader bars.

PREFERRED EMBODIMENT

Figure 8:
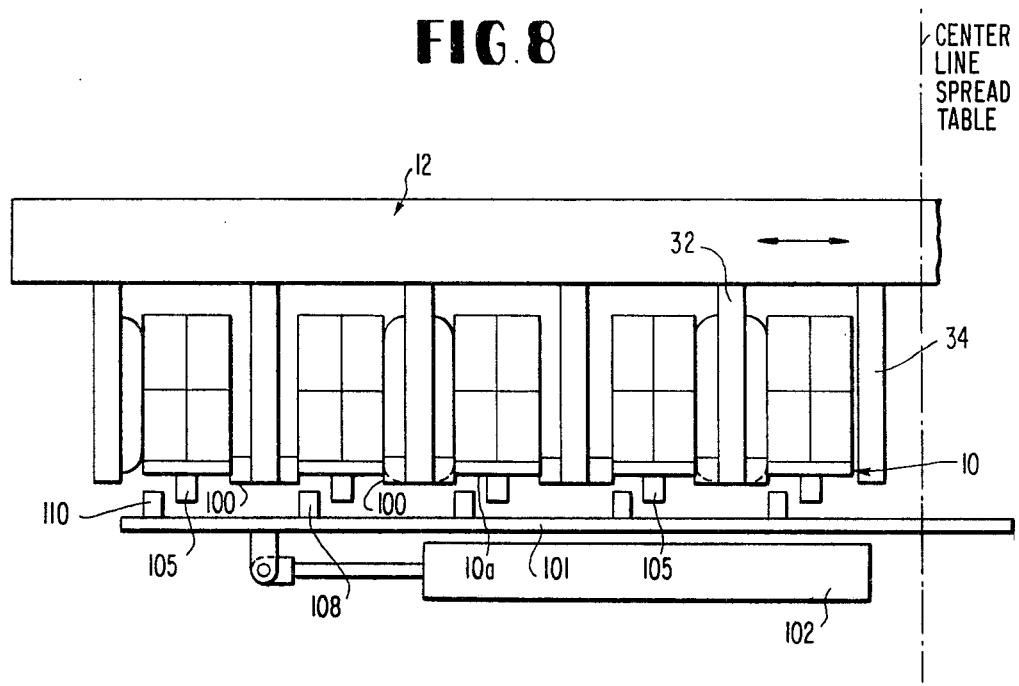
FIG. 8 is an end elevational view of a modified brick gripping head and spread table modified in accordance with a preferred embodiment of the invention.
Figure 9:
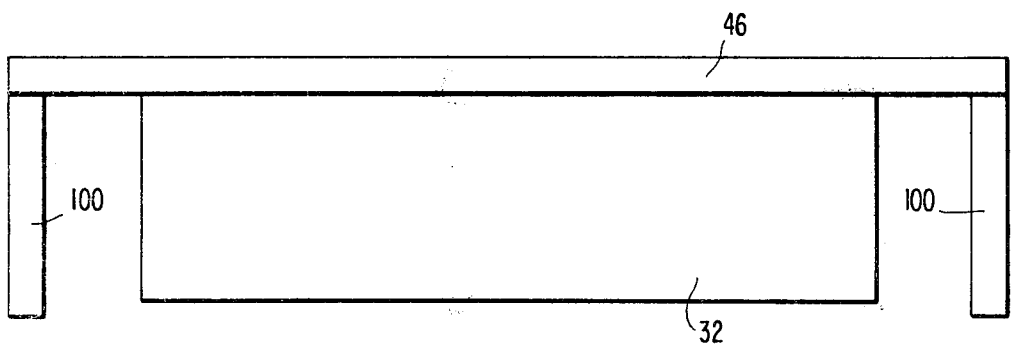
FIG. 9 is a side elevational view of a brick gripping member included in the modified brick gripping head shown in FIG. 8.

Referring to FIGS. 8 and 9, there is shown modified apparatus constituting a preferred embodiment of the invention wherein the spread table 10 is actuated from the overspread position to the final spacing position by means of the brick gripping members 32, 34 each of which have depending spacer members 100 on its opposite ends. When the brick gripping head 12 is lowered into the bricks which have been overspread, these spacer members 100 project downwardly through the spaces between the spreader bars 10a of the spread table 10 as shown in FIG. 8. Rather than actuate the spread table to move the bricks to their final spacings position as is done in the above-described embodiment of FIGS. 1 through 7, the brick gripping members of the head 12 in the preferred embodiment now being described are actuated by an electric motor (not shown) to move them closer together which will also cause the spreader bars 10a to simultaneously move closer together by virtue of the spacer members 100 engaging the spreader bars, as shown in FIG. 8, and moving them closer together as the brick gripping members are actuated closer to each other. Spacer members 100 will determine the limit of retracting movement of the brick gripping members and the spreader bars and consequently the final spacings between the bricks. In this embodiment, when the bricks are gripped by inflation of the air bags 32 as shown in FIG. 8, the bricks will not change their relative spacings or move on the spreader table because when the bricks are moved from their overspread position to the final spacings position prior to gripping with the air bags, the bricks will already be contacting or substantially contacting the rigid board members 30 so that subsequently upon inflation of the air bags 32, the bricks will remain in position except that the air bags 32 will expand and firmly press them against the boards 34. This arrangement is achieved by appropriate spacing of the brick gripping members on the head 12.

Further in the preferred embodiment presently described, the spread table will be actuated to the overspread position by its own hydraulic motor 102 shown in FIG. 8 which will move the outermost spreader bar which, in turn, through connecting links will move the other spreader bars similar to the above-described embodiment of FIGS. 1 through 7. However, hydraulic motor 102, in the presently described embodiment, is disengaged from the spread table 10 during movement from the overspread to the final spacings position. This is effected by the provision of cams 105 fixed to the underside of the spreader bars 10a to be engageable with a cam 108 on the actuating rod 101 of the hydraulic motor 102 when the rod is extended thus moving the spreader bars 10a to the overspread position. To move the spreader bars 10a to the closed position from the final spacings position, another cam 110 is provided on rod 101 of motor 102 to engage the cams 105 of the spreader bars as the rod is retracted. Intermediate the overspread and closed positions of the spread table, cams 108 and 110 are disengaged and spaced from cams 105 thus permitting the spreader bars to be moved from their overspread position to the final brick spacing position by means of the spacer members 100 of the brick gripping members as described above.

In the presently described preferred embodiment, suitable connecting links may be provided between the spreader bars 10a to transmit movement therebetween when moving the table to the overspread and closed positions.

The preferred embodiment shown in FIGS. 8 and 9 also illustrates another brick arrangement wherein the bricks are handled in pairs of rows with the spacings provided between each pair of rows of bricks in contrast to the above described embodiment where the spacings are provided between each successive rows of brick. In another arrangement, not shown, certain bricks in a group may be handled in pairs of rows and others in single rows. Any other spacing arrangement may be provided.

It should also be understood that although "eleven over four" (eleven rows, four bricks in a row) brick courses are stacked to form groups 1, 2, 3 and 4 on the kiln car 5 have been shown, this has been for illustrative purposes only and the present invention may be employed to provide other brick groups. Moreover, instead of handling two layers or courses of bricks at a time, the present invention may be employed to handle single brick layers. In addition, other spread table actuators and other brick gripping members may be employed in carrying out the method of the present invention.

Further in some applications where the bricks have a greater depth than standard bricks, such as in the case of blocks, it will not be necessary to rotate each successive layer stacked on the kiln car ninety degrees from the preceding layer to provide stability. Finally, it is again noted that the methods and apparatus of the present invention need not be limited to spacing bricks for kiln burning but could well be used in other brick handling operations.

What is claimed is:

1. In the art of arranging courses of green or raw bricks in a stack for firing in a kiln with each course including a plurality of parallel rows of bricks with predetermined final spacings between each of the rows of bricks; the method comprising the steps of: first arranging a course of bricks including a plurality of generally parallel rows of bricks with first predetermined spacings between the rows of bricks greater than said final predetermined spacings between the rows of bricks, then inserting brick gripping members between the rows of bricks to extend along the opposite sides of the bricks, then moving the rows of bricks towards each other to decrease the spacings therebetween to approximately equal said predetermined final spacings, and then gripping the opposite sides of the bricks with said brick gripping members, and transporting the course of bricks to a stack to be placed in a kiln for firing the bricks.

2. The method defined in claim 1 wherein said first predetermined spacings and said final predetermined spacings are achieved through the use of a spread table with the rows of bricks supported on elongated spreader bars included in the spreader table to be laterally movable relative to each other to space the rows of bricks from each other.

3. The method defined in claim 2 wherein the brick gripping members include inflatable bags and wherein after the brick gripping members are inserted between the rows of bricks and the rows of bricks are moved to approximate said final predetermined spacings, the inflatable bags are inflated to cause the bricks to be gripped between the brick gripping members.

4. The method defined in claim 3 wherein simultaneously with the movement of the spread table to place the rows of bricks with approximately said final predetermined spacings therebetween, the brick gripping members are moved to decrease the spacing therebetween after which said inflatable bags are inflated to cause the bricks to be gripped by the brick gripping members.

5. The method defined in claim 1 wherein simultaneously with movement of the rows of bricks to decrease their spacings to approximate said final predetermined spacings, the brick gripping members are also moved to decrease the spacings therebetween after which the brick gripping members are actuated to grip the bricks therebetween.

6. Apparatus for arranging and transporting courses of bricks in a plurality of generally parallel rows with predetermined final spacings between the rows for firing in a kiln or other uses, the apparatus comprising in combination; a spread table including a plurality of elongated generally parallel spreader bars movable between a first, closed position wherein the spreader bars are arranged in side-by-side relationship in a horizontal plane for receiving rows of bricks on the spreader bars, a second position in which the spreader bars are spread apart with the spacings between the spreader bars being greater than said final spacings, and a third position wherein the spreader bars are spread apart but with spacings therebetween approximately equal to said final spacings to be achieved, means for moving the spreader bars between said positions thereof, a setter head including a plurality of depending brick gripping members insertable in the spacings between the rows of bricks when the spreader bars of said spread table are in said second position, said brick gripping members including inflatable members and rigid support members for gripping the sides of bricks therebetween upon inflation of said inflatable members.

7. Apparatus defined in claim 6 wherein said inflatable members are bags including weights in the lower ends thereof.

8. Apparatus defined in claim 7 wherein said inflatable bags each have an inlet port for introducing and evacuating air into and from the bag, and wherein there is further included valve means for controlling the supply of air into the bags and evacuation of air out of the bags and wherein said weights cause the associated bags to deflate to evacuate air therefrom upon opening of the valve means to open the inlet port.

9. A spread table for arranging bricks in a plurality of spaced parallel rows for subsequent introduction into a kiln or for other uses, with the rows of bricks being spaced from each other in accordance with predetermined final spacings; the spread table comprising a plurality of elongated generally parallel spreader bars movable between a first, closed position wherein the spreader bars are arranged in side-by-side relationship in a horizontal plane for receiving rows of bricks on the spreader bars, a second position in which the spreader bars are spread apart with the spacings between the spreader bars being greater than said final spacings, and a third position wherein the spreader bars are spread apart but with spacings therebetween approximately equal to said final spacings to be achieved, means for moving the spreader bars between said positions thereof, and stop means for positively defining said third position of the spreader bars.

10. The spread table defined in claim 9 wherein said stop means includes spacer members receivable in the spaces between said spreader bars and engageable with the spreader bars for positively defining said third position of said spreader bars.

11. The spread table defined in claim 9 further including links interconnecting said spreader bars for transmitting movement from one spreader to the next adjacent spreader bar and wherein said stop means are associated with said links.

12. Apparatus for spacing rows of bricks to predetermined spacings, comprising a spread table having a set of elongated spreader bars for receiving rows of bricks, a brick gripping head having a set of depending brick gripping members for gripping opposite sides of rows of bricks on the spread table, said brick gripping members having depending spacer members receivable in the spaces between the spreader bars of the spread table, and means for retracting one of said sets of spreader bars and brick gripping members when the spacer members are received in the spaces between the spreader bars causing the other of said sets to also retract for decreasing the spacings between bricks received on the spreader bars.

13. Apparatus defined in claim 12 wherein said brick gripping members are retractable relative to each other while the spacer members are received in the spaces between the spreader bars, said brick gripping head having an associated motor for extending and retracting the brick gripping members relative to each other.

14. Apparatus defined in claim 13 wherein said spread table has an associated motor for spreading the spreader bars, said motor being disengageable from the spreader bars during retraction thereof by said spacer members.

15. The apparatus defined in claim 14 further including a number of cams fixed to and depending from a number of the spreader bars and wherein there is further included means operatively connected to the motor to be driven thereby, said last defined means including a plurality of spaced cams engageable with the cams fixed to the spreader bars.

16. Apparatus defined in claim 12 wherein said brick gripping members include an inflatable bag and a rigid support member for respectively gripping the opposite sides of bricks therebetween.

17. A spread table for arranging bricks in a plurality of spaced parallel rows for subsequent introduction into a kiln or for other uses, with the rows of bricks being spaced from each other in accordance with predetermined final spacings; the spread table comprising a plurality of elongated generally parallel spreader members movable between a first, closed position wherein the spreader members are arranged in side-by-side relationship in a horizontal plane for receiving rows of bricks on the spreader bars, a second position in which the spreader members are spread apart with the spacings between the spreader members being greater than said final spacings, and a third position wherein the spreader members are spread apart but with spacings less than the spacings at said second position of said spreader members, means for moving the spreader members between said positions thereof, and stop means for positively defining said third position of the spread members.

* * * * *